US009668283B2

(12) United States Patent
Abraham et al.

(10) Patent No.: US 9,668,283 B2
(45) Date of Patent: May 30, 2017

(54) COLLISION DETECTION AND BACKOFF WINDOW ADAPTATION FOR MULTIUSER MIMO TRANSMISSION

(75) Inventors: Santosh Paul Abraham, San Diego, CA (US); Simone Merlin, San Diego, CA (US); Vincent Knowles Jones, IV, San Diego, CA (US); Maarten Menzo Wentink, Naarden (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1330 days.

(21) Appl. No.: 13/098,089

(22) Filed: Apr. 29, 2011

(65) Prior Publication Data

US 2012/0106371 A1 May 3, 2012

Related U.S. Application Data

(60) Provisional application No. 61/331,631, filed on May 5, 2010, provisional application No. 61/361,863, filed on Jul. 6, 2010.

(51) Int. Cl.
*H04L 12/761* (2013.01)
*H04W 74/08* (2009.01)
(Continued)

(52) U.S. Cl.
CPC ........ *H04W 74/085* (2013.01); *H04B 7/0452* (2013.01); *H04L 1/1867* (2013.01); *H04L 2001/0093* (2013.01); *H04W 84/12* (2013.01)

(58) Field of Classification Search
USPC ........................................ 370/252, 335, 336
See application file for complete search history.

(56) References Cited

U.S. PATENT DOCUMENTS 7,616,612 B2* 11/2009 Koo et al. ..................... 370/336
8,169,944 B2 5/2012 Walton et al.
(Continued)

FOREIGN PATENT DOCUMENTS

JP 2005151359 A 6/2005
JP 2006013841 A 1/2006
(Continued)

OTHER PUBLICATIONS

Wang, et al. "An Adaptive Backoff Algorithm for IEEE 802.11 DCF with Cross-Layer Optimization," 6th International Conference on Wireless Communications Networking and Mobile Computing (WiCOM). Sep. 2010.

(Continued)

*Primary Examiner* — Omar Ghowrwal
*Assistant Examiner* — Angel Brockman
(74) *Attorney, Agent, or Firm* — Kevin M. Donnelly

(57) ABSTRACT

Certain aspects of the present disclosure generally apply to a wireless local area network (WLAN) where an access point (AP) has data to send to multiple stations (STAs). By using the Downlink Spatial Division Multiple Access (DL-SDMA) technique, the AP may send data at the same time towards multiple STAs. Certain aspects of the present disclosure provide techniques and apparatuses for detecting that a multiuser multiple-input multiple-output (MU-MIMO) transmission has suffered a collision and to adapting a contention window (CW) size for a backoff counter applied to a subsequent MU-MIMO transmission.

50 Claims, 9 Drawing Sheets

(51) Int. Cl.
    *H04B 7/0452*    (2017.01)
    *H04L 1/18*      (2006.01)
    *H04L 1/00*      (2006.01)
    *H04W 84/12*     (2009.01)

(56) References Cited

U.S. PATENT DOCUMENTS

| | | | |
|---|---|---|---|
| 2005/0157676 A1 | 7/2005 | Kwak et al. | |
| 2005/0270977 A1* | 12/2005 | King et al. | 370/235 |
| 2007/0195787 A1 | 8/2007 | Alnuweiri et al. | |
| 2008/0293366 A1* | 11/2008 | Haartsen | 455/69 |
| 2009/0080355 A1 | 3/2009 | Song | |
| 2009/0141739 A1 | 6/2009 | Hong et al. | |
| 2009/0303908 A1* | 12/2009 | Deb et al. | 370/310 |
| 2010/0002646 A1 | 1/2010 | Nishibayashi et al. | |
| 2010/0165907 A1 | 7/2010 | Chu et al. | |
| 2010/0195664 A1 | 8/2010 | Ho | |
| 2010/0284380 A1* | 11/2010 | Banerjee et al. | 370/338 |
| 2010/0309872 A1 | 12/2010 | Amini et al. | |

FOREIGN PATENT DOCUMENTS

| | | |
|---|---|---|
| JP | 2007243952 A | 9/2007 |
| JP | 2009010935 A | 1/2009 |
| JP | 2009206573 A | 9/2009 |
| JP | 2010538514 A | 12/2010 |
| WO | WO-2004038951 A2 | 5/2004 |
| WO | WO-2008075316 A2 | 6/2008 |
| WO | WO2009027931 A2 | 3/2009 |
| WO | 2010009039 A1 | 1/2010 |

OTHER PUBLICATIONS

Cai et al., "A Distributed Multi-User MIMO MAC Protocol for Wireless Local Area Networks", IEEE GLOBECOM Global Telecommunications Conference, Nov. 30, 2008, pp. 1-5, IEEE, XP031370635, ISBN: 978-1-4244-2324-8, DOI: 10.1109/GLOCOM.2008.ECP.952.

Choi et al., "Exploiting Multiuser MIMO in the IEEE 802.11 Wireless LAN Systems", Wireless Personal Communications, May 2, 2009, pp. 385-396, vol. 54, No. 3, Kluwer Academic Publishers, XP019832930, ISSN: 1572-834X, DOI: 10.1007/s11277-009-9731-2.

Gong et al., "A CSMA/CA MAC Protocol for Multi-User MIMO Wireless LANs" Global Telecommunications Conference (GLOBECOM), Dec. 6, 2010, pp. 1-6, IEEE, XP031846857, ISBN: 978-1-4244-5636-9, DOI: 10.1109/GLOCOM.2010.5684351.

Gong et al., "DL MU MIMO Analysis and OBSS Simulation Results", IEEE 802.11, May 15, 2010, pp. 1-22, XP002649356, Retrieved from the Internet : URL: https://mentor.ieee.org/802.11/dcn/10/11-10-0567-00-00ac-dl-mu-mimo-analysis-and -obss-simulation.pptx [retrieved on Jul. 11, 2011].

Gong et al.,"DL MU MIMO Error Handling and Simulation Results", IEEE 802.11 no.—IEEE 802.11-10/0324r0 Mar. 15, 2010 (Mar. 15, 2010), pp. 1-22, XP002649355, Retrieved from the Internet: URL: https ://mentor. ieee.org/802.11/dcn/10/ 11-10-0324-00-00ac-dl-mu-mimo-error-handling-and-simulation. ppt [retrieved on Jul. 11, 2011].

IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications; IEEE Std 802.11-2007 (Revision of IEEE Std 802.1, IEEE Standard; [IEEE Standard], IEEE, Piscataway, NJ, USA, Jun. 12, 2007 (Jun. 12, 2007), pp. C1-C1184, XP017604022,ISBN: 978-0-7381-5656-9.

International Search Report and Written Opinion—PCT/US2011/035298—ISA/EPO—Jul. 25, 2011.

Mirkovic et al., "A MAC Protocol for MIMO Based IEEE 802.11 Wireless Local Area Networks" IEEE Wireless Communications and Networking Conference (WCNC), 2007, Mar. 1, 2007, pp. 2131-2136, IEEE Operations Center, XP031097537, ISBN: 978-1-4244-0658-6, DOI: 10.1109/WCNC.2007.399.

European Search Report—EP14001052—Search Authority—Munich—May 22, 2014.

* cited by examiner

COLLISION DETECTION AND BACKOFF WINDOW ADAPTATION FOR MULTIUSER MIMO TRANSMISSION

CROSS-REFERENCE TO RELATED APPLICATIONS

This application claims benefit of U.S. Provisional Patent Application Ser. No. 61/331,631, filed May 5, 2010, and U.S. Provisional Patent Application Ser. No. 61/361,863, filed Jul. 6, 2010, both of which are herein incorporated by reference.

BACKGROUND

Field

Certain aspects of the present disclosure generally relate to wireless communications and, more particularly, to detecting that a multiuser multiple-input multiple-output (MU-MIMO) transmission has suffered a collision and to adapting the backoff window size for a subsequent MU-MIMO transmission.

Background

In order to address the issue of increasing bandwidth requirements demanded for wireless communications systems, different schemes are being developed to allow multiple user terminals to communicate with a single access point by sharing the channel resources while achieving high data throughputs. Multiple-Input Multiple-Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure generally apply to a wireless local area network (WLAN) where an access point (AP) has data to send to multiple stations (STAs). By using the Downlink Spatial Division Multiple Access (DL-SDMA) technique, the AP may send data at the same time towards multiple STAs. Certain aspects of the present disclosure generally relate to detecting that a multiuser multiple-input multiple-output (MU-MIMO) transmission has suffered a collision and to adapting a contention window size for a backoff counter applied to a subsequent MU-MIMO transmission.

Certain aspects of the present disclosure provide a method for wireless communications. The method generally includes simultaneously transmitting a first plurality of packets to a plurality of apparatuses in a first transmission, determining that at least one of a plurality of acknowledgments corresponding to the first plurality of packets was not received from at least one of the plurality of apparatuses, and increasing a contention window (CW) for a backoff counter based on the determination.

Certain aspects of the present disclosure provide an apparatus for wireless communications. The apparatus generally includes a transmitter configured to simultaneously transmit a first plurality of packets to a plurality of apparatuses in a first transmission and a processing system configured to determine that at least one of a plurality of acknowledgments corresponding to the first plurality of packets was not received from at least one of the plurality of apparatuses and to increase a CW for a backoff counter based on the determination.

Certain aspects of the present disclosure provide an apparatus for wireless communications. The apparatus generally includes means for simultaneously transmitting a first plurality of packets to a plurality of apparatuses in a first transmission, means for determining that at least one of a plurality of acknowledgments corresponding to the first plurality of packets was not received from at least one of the plurality of apparatuses, and means for increasing a CW for a backoff counter based on the determination.

Certain aspects of the present disclosure provide a computer-program product for wireless communications. The computer-program product generally includes a computer-readable medium comprising instructions executable to simultaneously transmit a first plurality of packets to a plurality of apparatuses in a first transmission, to determine that at least one of a plurality of acknowledgments corresponding to the first plurality of packets was not received from at least one of the plurality of apparatuses, and to increase a CW for a backoff counter based on the determination.

Certain aspects of the present disclosure provide an access point. The access point generally includes at least one antenna; a transmitter configured to simultaneously transmit, via the at least one antenna, a first plurality of packets to a plurality of apparatuses in a first transmission; and a processing system configured to determine that at least one of a plurality of acknowledgments corresponding to the first plurality of packets was not received from at least one of the plurality of apparatuses and to increase a CW for a backoff counter based on the determination.

Certain aspects of the present disclosure provide a method for wireless communications. The method generally includes simultaneously transmitting a first plurality of packets to a plurality of apparatuses in a first transmission, wherein the first plurality of packets comprises a packet associated with an access category selected from a plurality of access categories, determining that an acknowledgment corresponding to the packet was not received from a designated apparatus of the plurality of apparatuses, wherein the designated apparatus is associated with the selected access category, and increasing a contention window (CW) for a backoff counter associated with the selected access category, based on the determination.

Certain aspects of the present disclosure provide an apparatus for wireless communications. The apparatus generally includes a transmitter configured to simultaneously transmit a first plurality of packets to a plurality of apparatuses in a first transmission, wherein the first plurality of packets comprises a packet associated with an access category selected from a plurality of access categories, a first circuit configured to determine that an acknowledgment corresponding to the packet was not received from a designated apparatus of the plurality of apparatuses, wherein the designated apparatus is associated with the selected access category, and a second circuit configured to increase a contention window (CW) for a backoff counter associated with the selected access category, based on the determination.

Certain aspects of the present disclosure provide an apparatus for wireless communications. The apparatus generally includes means for simultaneously transmitting a first plurality of packets to a plurality of apparatuses in a first transmission, wherein the first plurality of packets comprises a packet associated with an access category selected from a plurality of access categories, means for determining that an acknowledgment corresponding to the packet was not received from a designated apparatus of the plurality of apparatuses, wherein the designated apparatus is associated with the selected access category, and means for increasing a contention window (CW) for a backoff counter associated with the selected access category, based on the determination.

Certain aspects of the present disclosure provide a computer-program product for wireless communications. The computer-program product generally includes a computer-readable medium comprising instructions executable to simultaneously transmit a first plurality of packets to a plurality of apparatuses in a first transmission, wherein the first plurality of packets comprises a packet associated with an access category selected from a plurality of access categories, determine that an acknowledgment corresponding to the packet was not received from a designated apparatus of the plurality of apparatuses, wherein the designated apparatus is associated with the selected access category, and increase a contention window (CW) for a backoff counter associated with the selected access category, based on the determination.

Certain aspects of the present disclosure provide an access point. The access point generally includes at least one antenna, a transmitter configured to simultaneously transmit a first plurality of packets to a plurality of apparatuses in a first transmission, wherein the first plurality of packets comprises a packet associated with an access category selected from a plurality of access categories, a first circuit configured to determine that an acknowledgment corresponding to the packet was not received from a designated apparatus of the plurality of apparatuses, wherein the designated apparatus is associated with the selected access category, and a second circuit configured to increase a contention window (CW) for a backoff counter associated with the selected access category, based on the determination.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
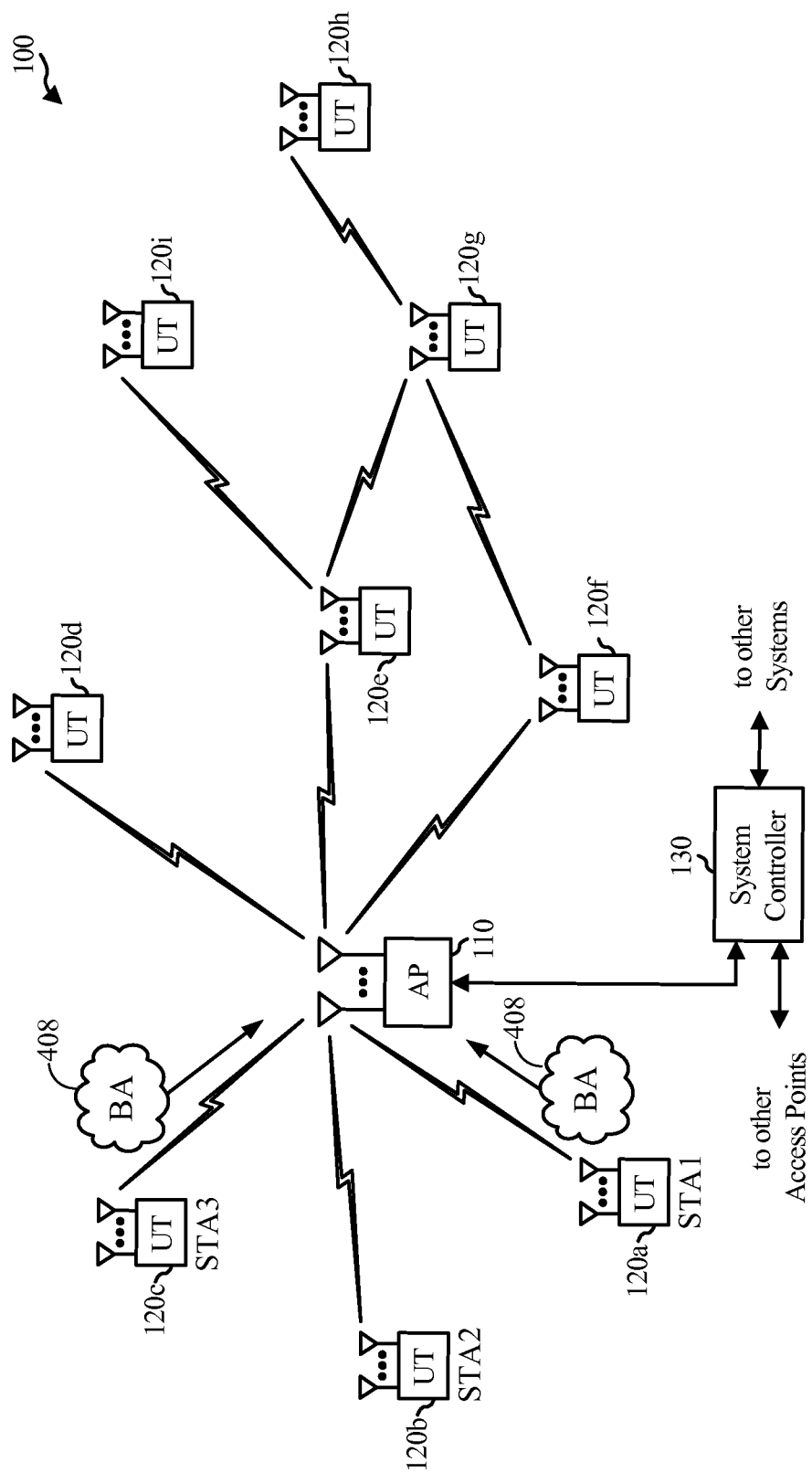
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals, and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means, K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
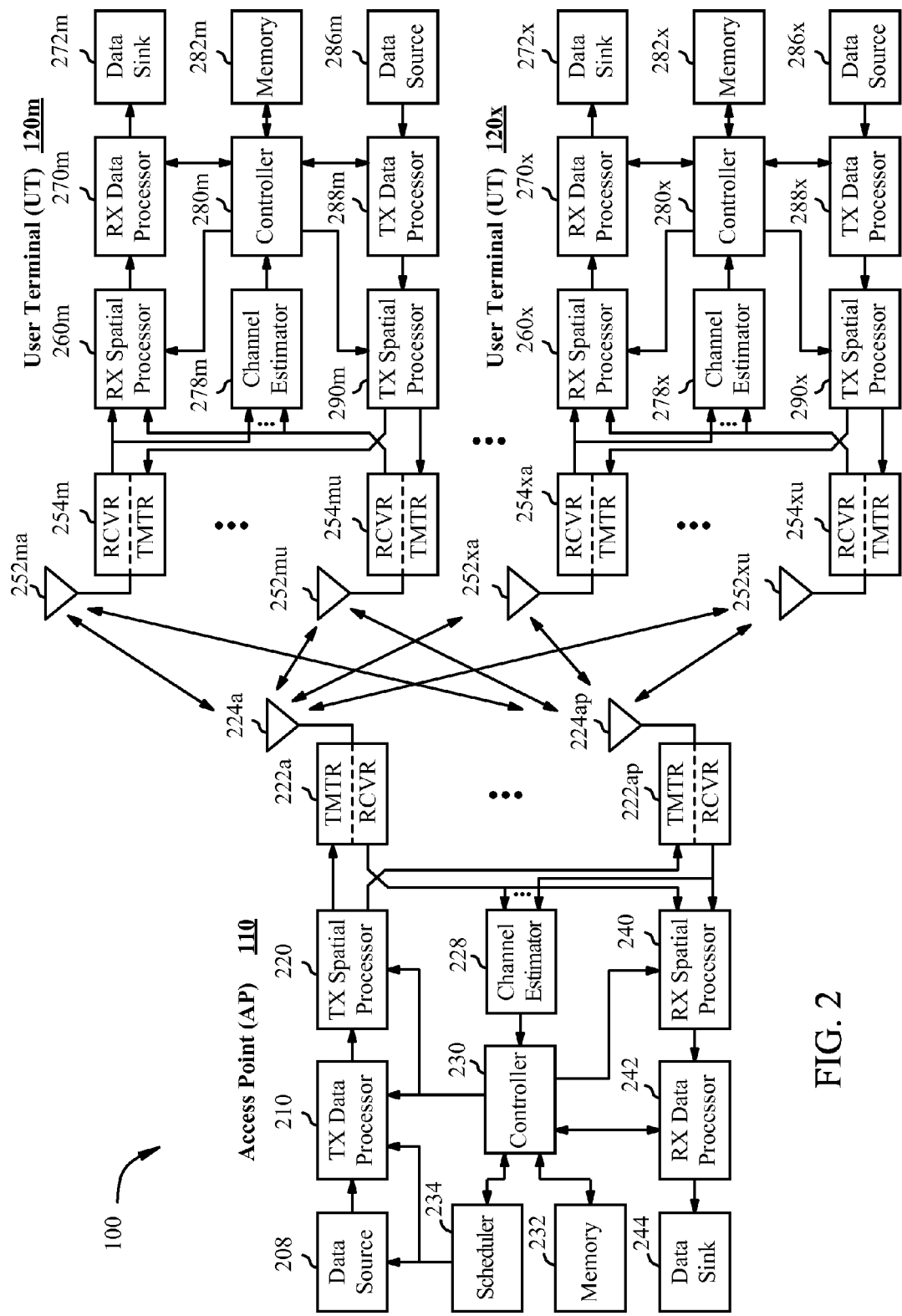
FIG. 2 illustrates a block diagram of an example access point and user terminals in accordance with certain aspects of the present disclosure.

FIG. 2 illustrates a block diagram of access point 110 and two user terminals 120m and 120x in the MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC) or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates and so on) to the access point. Controllers 230 and 280 also control the operation of various processing units at access point 110 and user terminal 120, respectively.

Figure 3:
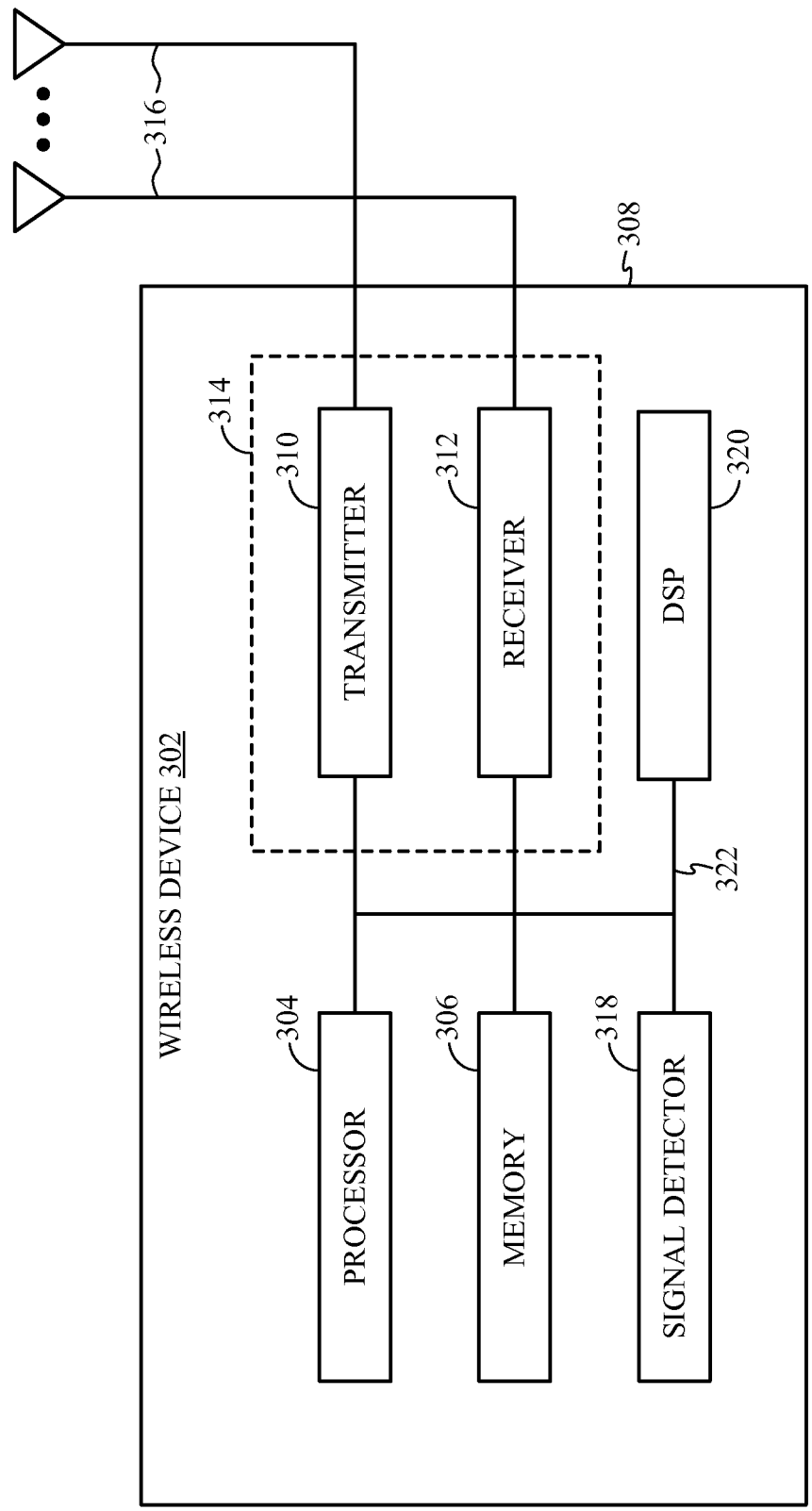
FIG. 3 illustrates a block diagram of an example wireless device in accordance with certain aspects of the present disclosure.

FIG. 3 illustrates various components that may be utilized in a wireless device 302 that may be employed within a wireless communication system, such as MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Collision Detection and Contention Window Updating

In next generation WLANs, such as the MIMO system 100 from FIG. 1, downlink (DL) multi-user (MU) MIMO transmission represents a promising technique for increasing overall network throughput. In most aspects of a DL MU-MIMO transmission, a non-beamformed portion of a preamble transmitted from an access point (AP) to a plurality of user stations (STAs) may carry a spatial stream allocation field indicating allocation of spatial streams to the STAs.

In an effort to parse this allocation information from the perspective of a STA, each STA may determine its ordering or a STA number in a set of STAs from the plurality of STAs scheduled to receive the MU transmission. This determination may entail formation of groups, wherein a group identification (group ID) field in the preamble may convey, to the STAs, the set of STAs (and their order) being transmitted in a given MU transmission. With preamble bits adding to the transmission overhead, it may be desirable to expend as few bits on the group ID as possible, while not sacrificing flexibility related to which STAs can be scheduled together in a MU-MIMO transmission at a given time instant.

In single user (SU) transmissions, a packet is sent to a given STA, which in turn typically returns an acknowledgment (ACK). Based on the received ACK (or a missing ACK), the sender (e.g., the AP) may determine if the transmission was successful (or experienced a collision). In IEEE 802.11, if a packet experiences a collision, some rules apply to the backoff value for successive transmissions.

Before each transmission, the AP may generate a random number between 0 and CW (CW=contention window) called the backoff counter. The AP may then start counting down the backoff value while the (wireless) medium is idle. Once the backoff counter reaches 0, the AP is allowed to send a packet via the medium.

The packet may not be received or may be incorrectly received by the intended recipient, and in such cases, a block acknowledgment (BA) is not sent by the recipient as a reply. As a response to this event, the AP may retransmit the same packet.

The value CW in the current IEEE 802.11 standard is set to an initial value $CW_{min}$ for the first transmission of a given packet and then computed as $CW=CW_{min}^{R+1}$ for each consecutive packet retransmission, where R is a counter counting the number of consecutive collisions of the same packet (R=1 for the first re-transmission, and so on). A transmission may be considered "failed" if the BA for the data packet is not received.

The rationale behind this choice of increasing CW is based on the assumption that a transmitted packet was not received correctly because the packet collided with another transmission. Thus, the absence of a BA may be used as a way to detect a collision. As a response to the collision, the CW may be increased so that the AP may most likely wait more time before accessing the medium, avoiding successive collisions.

Figure 4:
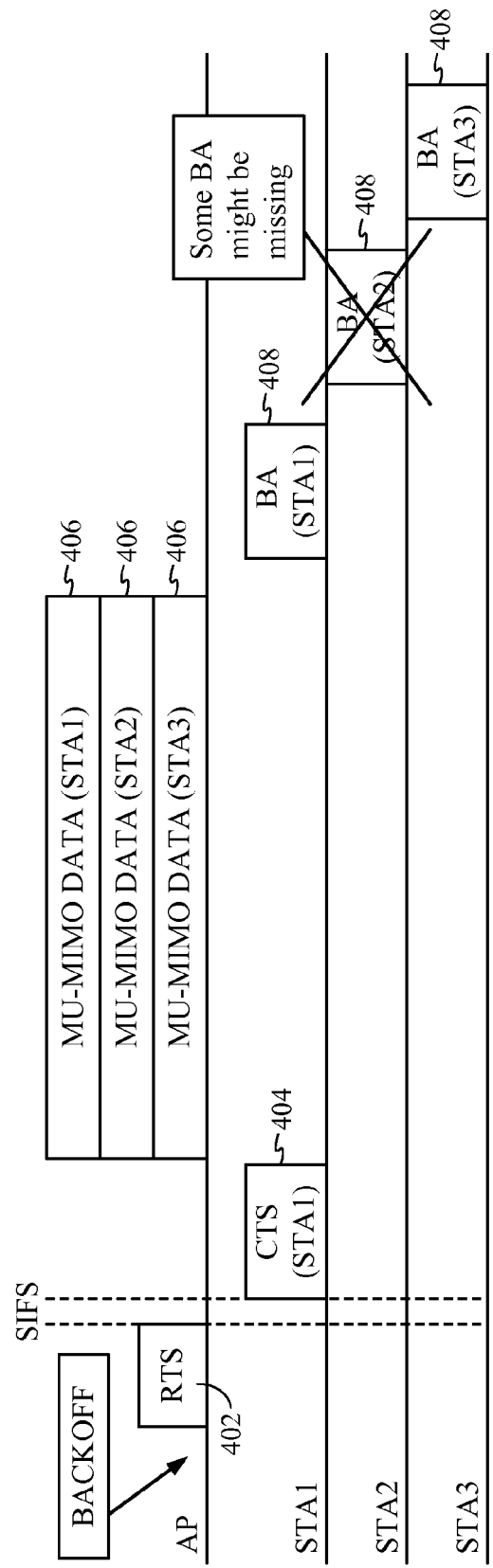
FIG. 4 illustrates an example downlink multiuser multiple-input multiple-output (DL-MU-MIMO) protocol in accordance with certain aspects of the present disclosure.

FIG. 4 illustrates an example downlink multiuser multiple-input multiple-output (DL-MU-MIMO) protocol in accordance with certain aspects of the present disclosure. To begin, the AP may transmit a Request to Send (RTS) message 402 to one of the STAs (e.g., STA1) selected to receive the DL-MU-MIMO transmission. All data in the MU-MIMO aggregate may be of the same priority class. The RTS message 402 may be sent using contention parameters of a data class in the MU-MIMO aggregate.

Upon receiving the RTS message 402, the selected STA (e.g., STA1) may transmit a Clear to Send (CTS) message 404 to the AP. The RTS message 402 and the CTS message 404 may be separated by a short interframe space (SIFS), a small interval between a data frame or other message and its acknowledgment (ACK). In response to receiving the CTS message 404, the AP may send DL-MU-MIMO data 406 to STAs selected by the scheduler (typically part of the processing system of the AP, such as scheduler 234 in FIG. 2). The STAs receiving the MU-MIMO data 406 may transmit BAs 408 in the uplink (UL) in series, starting with the BA for STA1 and ending with the BA for STA3 as shown in FIG. 4. The STA BA transmissions may be separated by SIFS. The order and timing for the STA BA transmissions may be sent in the DL-MU-MIMO data 406.

In DL-MU-MIMO transmissions, multiple packets are sent at the same time toward different STAs. If all the acknowledgments (ACKs) are received, the transmission may be considered successful. If no ACK is received, all the packets presumably failed, and this event may reasonably be interpreted as a collision. If only some of the ACKs are missing, while others are received, then the meaning of this event (i.e., whether this was a collision or a collision for only some of the STAs) and the appropriate reaction in terms of increasing the contention window (CW) may be defined. For example, in FIGS. 1 and 4, MU-MIMO data 406 was sent to STA1 (user terminal 120a), STA2 (user terminal 120b), and STA3 (user terminal 120c), and a BA was subsequently received from each of STA1 and STA3, but not from STA2.

Figure 5:
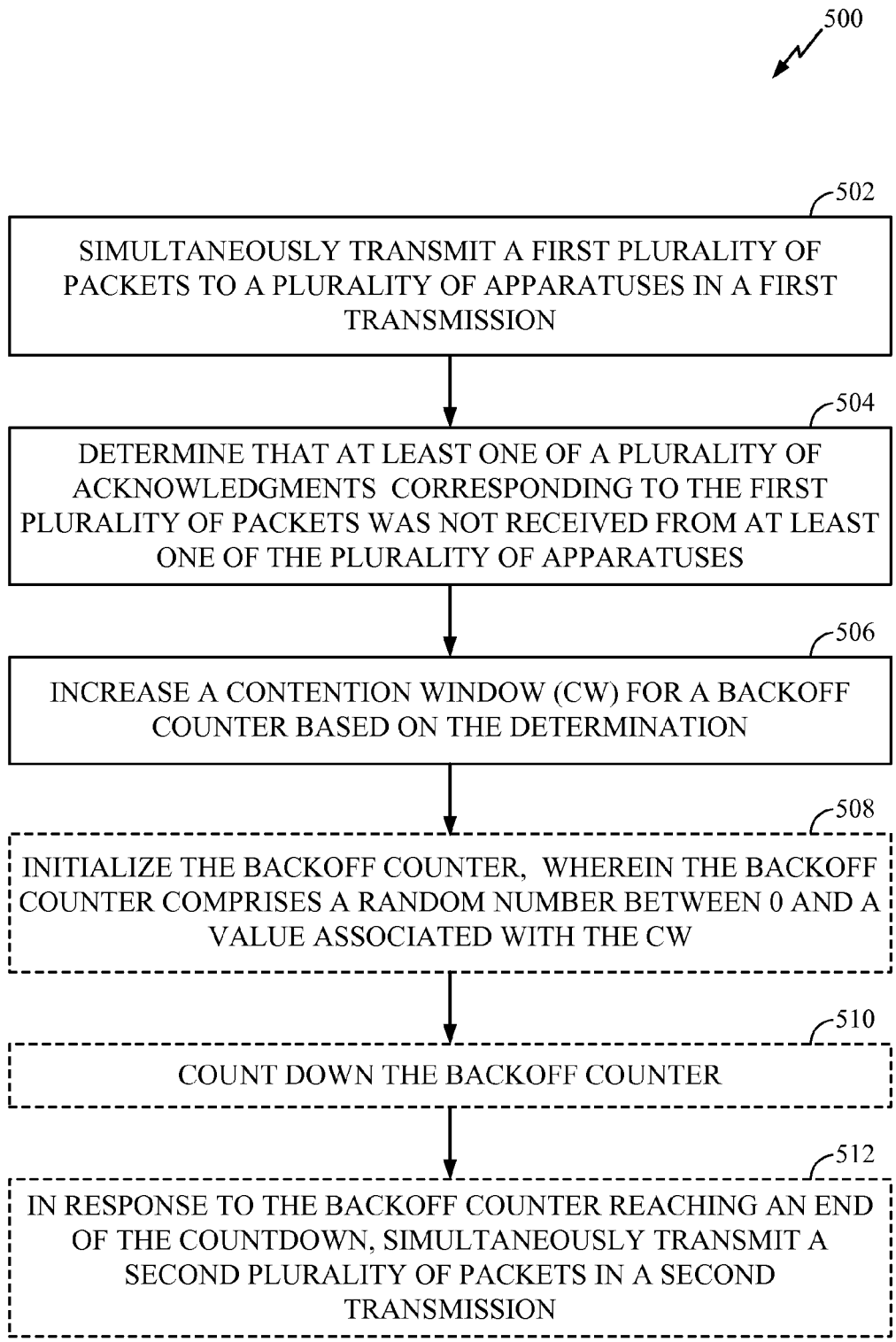
FIG. 5 illustrates example operations that may be performed at an access point to detect a collision and update a contention window in accordance with certain aspects of the present disclosure.

FIG. 5 illustrates example operations 500 that may be performed at an access point, for example, to detect a collision and update a contention window in accordance with certain aspects of the present disclosure. The operations 500 may begin, at 502, by simultaneously transmitting a first plurality of packets to a plurality of apparatuses (e.g., STAs) in a first transmission. For certain aspects, the first plurality of packets may comprise DL-MU-MIMO packets. At 504, the access point may determine that at least one of a plurality of acknowledgments corresponding to the first plurality of packets was not received from at least one of the plurality of apparatuses. For certain aspects, the plurality of acknowledgements may comprise block acknowledgments. The access point may, at 506, increase a contention window (CW) for a backoff counter based on the determination at 504.

For certain aspects, the operations 500 may comprise incrementing a counter based on the determination at 504, such that increasing the CW at 506 comprises calculating the CW based on the counter. Calculating the CW may comprise raising a minimum CW value ($CW_{min}$) to the power of a sum of the counter and 1 for certain aspects, as described in detail below.

For certain aspects, the AP may optionally initialize the backoff counter at 508. The backoff counter may be generated as a random number between 0 and a value associated with the CW. At 510, the AP may optionally count down the backoff counter (e.g., from the random number at initialization). In response to the backoff counter reaching an end of the countdown (e.g., a value of zero), the AP may simultaneously transmit, at 512, a second plurality of packets in a second transmission. For certain aspects, the second plurality of packets may comprise DL-MU-MIMO packets.

For certain aspects, the AP may optionally provide a plurality of counters, one counter for each of the plurality of apparatuses (e.g., STAs). For each of the plurality of counters, the AP may: (1) increment the counter for a particular one of the apparatuses in response to not receiving one of the plurality of acknowledgments corresponding to the particular one of the apparatuses; and (2) reset the counter for a particular one of the apparatuses in response to receiving one of the plurality of acknowledgments corresponding to the particular one of the apparatuses.

After a DL-MU-MIMO data transmission, the access point may determine if each expected and valid BA is received or missing and update the CW for the next transmission based on the received or missing BAs in the previous transmission(s). A valid block may be defined in any one of various suitable ways, including:

any block ACK;

any block ACK of a specific class, where the specific class may be the class used to access the medium in the previous data transmission;

specifically for IEEE 802.11e networks, a BA from a STA may be considered valid if this BA contains an affirmative acknowledgment of at least one of the media access control (MAC) protocol data units (MPDUs) sent to the STA in the just preceding MU-MIMO transmission; or specifically for IEEE 802.11e networks, a BA from a STA may be considered valid if this BA contains an affirmative acknowledgment of all the MPDUs sent to the STA in the just preceding MU-MIMO transmission.

Figure 6:
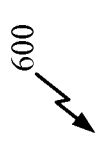
FIG. 6 is a chart listing various options for detecting a collision and rules for calculating the contention window depending on the various options, in accordance with certain aspects of the present disclosure.

The present disclosure describes different solutions for how a missing acknowledgment may be interpreted and may affect the backoff rules through increasing the contention window (CW). Increasing the CW may be performed according to any of Options 1 to 4 described below and summarized in the chart 600 of FIG. 6, illustrating various rules for determining the contention window based on the options for declaring a collision occurred.

Option 1

For certain aspects of the disclosure, if the first STA in the plurality of STAs for DL-MU-MIMO transmission does not return a valid BA, the transmission may be considered to have suffered a collision. For example, if the BA from STA1 in FIG. 4 was not received, the AP may interpret this result as meaning that a collision occurred. In contrast, if the BA from STA1 in FIG. 4 is received, but the BA from STA2 or STA3 is not received, the AP may consider this as a successful transmission and may not interpret this result as meaning that a collision occurred under Option 1.

The AP may maintain a counter R, which counts consecutive collisions. The CW may be increased as a function of R. For example, the contention window may be initially set to a value of $CW=CW_{min}$, and CW may be calculated to equal $CW_{min}^{R+1}$ for each consecutive collision as illustrated in FIG. 6. As another example, the contention window may be initially set to a value of $CW=CW_{min}$, and CW may be calculated to equal $CW_{min}*2^R$ for each consecutive collision. For certain aspects, CW may be limited to growing no higher than a maximum value called $CW_{max}$.

Option 2

For certain aspects of the disclosure, if any one of the STAs does not return a valid BA, the transmission is considered to have suffered a collision. For example, if any BA from STA1, STA2, or STA3 in FIG. 4 was not received, the AP may interpret this result as meaning that a collision occurred.

Similar to Option 1, the contention window for Option 2 may be initially set to a value of $CW=CW_{min}$, and CW may be calculated to equal $CW_{min}^{R+1}$ for each consecutive collision as illustrated in FIG. 6. For other aspects, CW may be calculated to equal $CW_{min}*2^R$ for each consecutive collision. For certain aspects, CW may be limited to growing no higher than a maximum value called $CW_{max}$.

Option 3

For certain aspects of the disclosure, if all STAs do not return a valid BA, the transmission is considered to have suffered a collision. For example, if none of the BAs from STA1, STA2, and STA3 in FIG. 4 were received, the AP may reasonably decide that a collision occurred. However, if at least one of the BAs from STA1, STA2 or STA3 was received, the AP may not consider that a collision has occurred under this option.

Similar to Option 1, the contention window for Option 3 may be initially set to a value of $CW=CW_{min}$, and CW may be calculated to equal $CW_{min}^{R+1}$ for each consecutive collision as illustrated in FIG. 6. For other aspects, CW may be calculated to equal $CW_{min}*2^R$ for each consecutive collision. For certain aspects, CW may be limited to growing no higher than a maximum value called $CW_{max}$.

Option 4

For certain aspects of the disclosure, collisions may be counted on a per-STA basis, where the AP may assume that a particular STA suffered a collision if that STA does not return a valid BA. For example, if the BA from STA2 in FIG. 4 was not received, but the BAs from STA1 and STA3 were, the AP may determine that STA2 suffered one collision and that STA1 and STA3 did not suffer a collision.

For this option, the AP may maintain a counter $R_i$ for each $STA_i$ and may count the number of consecutive collisions corresponding to that particular $STA_i$. Before a transmission, the contention window may be computed as a function of $\{R_i, \ldots, R_j\}$, where $\{R_i, \ldots, R_j\}$ indicates the counters corresponding to the individual STAs $\{STA_i, \ldots, STA_j\}$ that are going to be included in the transmission. For example, such a function may include computing CW as $CW=CW_{min}^{R_{max}}$, where $R_{max}$ is the maximum of the set $\{R_i, \ldots, R_j\}$.

With any of these options described above, the collision detection and backoff rules as specified for an IEEE 802.11 network may be extended to the case of downlink multiuser MIMO (DL-MU-MIMO) transmissions. This may preserve fairness with respect to legacy IEEE 802.11 devices in mixed networks including both legacy and MU-MIMO capable devices.

Example Collision Detection and Backoff Window Adaptation for Multiple Access Category MU-MIMO Transmission Exponential backoff after a collision may be essential for robust operation of enhanced distributed channel access (EDCA) in an IEEE 802.11 network. Detection of the collision may not be straightforward when a single downlink multiuser packet (DLMP) (i.e., transmission) from an access point (AP) yields block acknowledgments (BAs) from several destinations. For certain aspects, detection of a collision may be extended to multiple access categories (multi-AC) MU-MIMO transmissions, wherein BAs referring to different classes (i.e., access categories) may be received on each DLMP.

For certain aspects, collisions may occur on a subset of STAs for a MU-MIMO transmission. Moreover, collisions in subsequent transmissions may affect different subsets of STAs. Collisions may be caused by (and affect) a different contending STA per each destination STA in the DLMP (i.e., STAs may be hidden from each other). For certain aspects, a collision-detection-and-contention-window-(CW)-increase mechanism may be involved that does not penalize IEEE 802.11ac APs with respect to co-located contending IEEE 802.11n APs (i.e., as aggressive as an IEEE 802.11n AP). Further, a collision-detection-and-CW-increase mechanism may be desired that is fair with contending STAs (i.e., at least as fair as an IEEE 802.11n AP). Moreover, detection of a collision may be extended to multi-AC MU-MIMO transmissions.

For Option 2, described above, the AP may be sensitive to collisions at individual STAs (as in IEEE 802.11n). In other words, the AP may be as or less aggressive than an IEEE 802.11n AP. However, CW, at the AP, may be biased towards a larger value due to just one STA that suffers a high packet error rate. In other words, there may be lower throughput for IEEE 802.11ac BSSs if contending with IEEE 802.11n BSSs. Further, consecutive losses may come from different STAs, wherein Option 2 may not distinguish between the different STAs and the AP may continue increasing the CW (i.e., too conservative).

For Option 3, described above, the CW for an AP may not be biased by the worst STA. However, the AP may not be sensitive to collisions at individual STAs. In other words, exponential backoff may never occur if there is one "lucky" STA that is not affected by collisions while other STAs experience collision (i.e., more aggressive than an IEEEE 802.11n AP).

For certain aspects, a mechanism may be designed that behaves similarly to an IEEE 802.11n AP. A primary STA may be defined per each class (i.e., the STA that would have been served if that class won the contention; if AP was IEEE 802.11n). Backoff rules may be based on the primary STA of the class that wins the contention. In other words, what happens to other MU-MIMO data may be ignored.

An IEEE 802.11n AP may transmit to a single STA, but the produced interference may cause collisions at other locations. The IEEE 802.11n AP may not detect those collisions. MU-MIMO may involve transmitting to multiple STAs at the same time and may include the ability to detect collisions at multiple destinations. However, detecting collisions at multiple destinations may lead to a more conservative access than IEEE 802.11n. Although Option 2, described above, may consider collisions at a single STA, that STA may be any STA, and may be a different STA at each transmission (i.e., no memory). Further, Option 2 does not specify how to deal with multiple classes. In other words, Option 2 may not be a correct extension for the IEEE 802.11n mechanism.

In IEEE 802.11n, each class may contend with other classes internally (i.e., within the AP). The winner class may send a head of line (HOL) packet. For certain aspects, the HOL packet may also be a packet being retransmitted. If the packet fails, the contention window for that access category (CW[AC]) may be increased. If the packet goes through or reaches the maximum retry limit, the CW may be reset. A new contention window may be started again for the next access. The new contention winner may be from any of the classes. The appropriate CW[AC] may be used.

For certain aspects, an AP may designate a primary STA per each class. The primary STA per each class may be the destination of the HOL data (i.e., primary data) belonging to the class. After internal contention, there may be a "winner class," wherein the AP may send data for the winner class. The winner class may be selected according to the IEEE 802.11n enhanced distributed channel access (EDCA) rules. For certain aspects, the AP may also piggyback (i.e., MU-MIMO) some other data from the same or different classes, wherein selection of the other data may be up to an AP scheduler. At each transmission, only the CW[AC] for the winner class may be updated, based on the acknowledgment (ACK) coming from the primary STA of the winner class only. If the ACK is received, the CW of the winner class may be reset. Further, the title "primary" from the STA may be removed, and a new STA may be elected as primary. If the winner class queue is backlogged, a new backoff may be generated, based on CW as in IEEE 802.11n.

However, if the ACK is not received, the CW of the winner class may be increased. Further, the primary STA may remain the same for the winner class. Moreover, the backoff counter may be regenerated based on a quality of service (QoS) short retry counter (QSRC) as in 802.11n. The QSRC may determine how often a frame is retransmitted after a collision until the frame is discarded. In response to the backoff counter reaching an end of the countdown, a second plurality of packets in a second transmission may be transmitted, wherein the second plurality of packets comprises the packet associated with the winner class. The CW and backoff value for classes other than the winner class may not be modified. Therefore, all collisions or successful transmission other than the one for the primary STA of the winner class may be ignored (i.e., for QSRC update). However, aggregated MAC protocol data unit (A-MPDU) retry counters may always be updated for all STAs in order to avoid some MPDUs being re-sent forever. On the next transmission, the AP may again perform internal contention among classes. Therefore, the winner class may be different at each transmission.

If only one STA can be served at each transmission (i.e., no MU-MIMO), that STA may be the primary STA for the class that wins the contention (i.e., behavior is the same as IEEE 802.11n). However, if multiple STAs are served at each transmission, the behavior of the STAs other than the primary STA may not affect the backoff (i.e., MU-MIMO may be completely transparent). In other words, the mechanism may have the same backoff behavior as an IEEE 802.11n AP.

Figure 7:
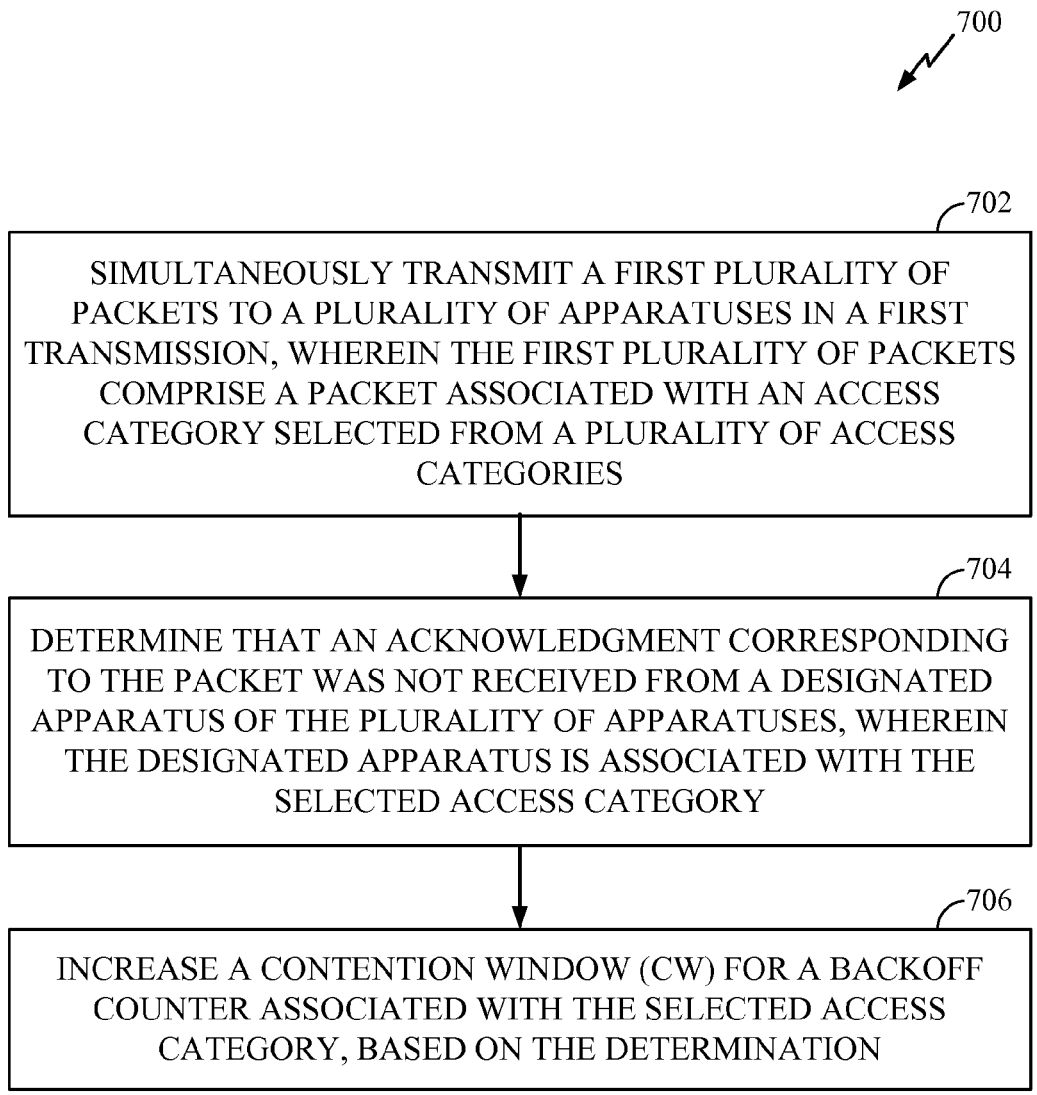
FIG. 7 illustrates example operations that may be performed at an access point to detect a collision and update a contention window in accordance with certain aspects of the present disclosure.
Figure 7A:
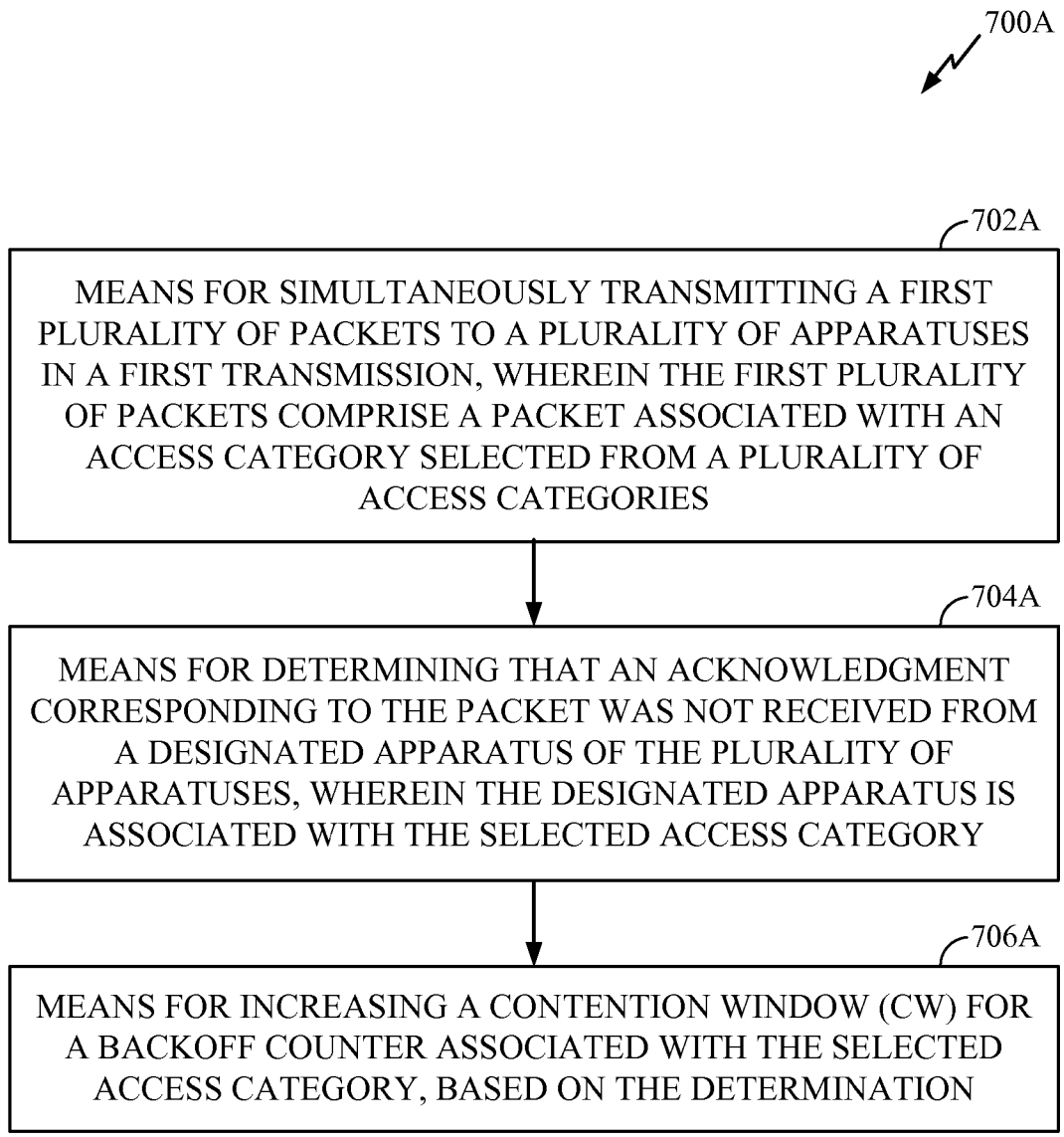
FIG. 7A illustrates example means capable of performing the operations shown in FIG. 7.

FIG. 7 illustrates example operations 700 that may be performed at an access point, for example, to detect a collision and update a contention window in accordance with certain aspects of the present disclosure. The operations 700 may begin, at 702, by simultaneously transmitting a first plurality of packets to a plurality of apparatuses (e.g., STAs)

in a first transmission, wherein the first plurality of packets comprise a packet associated with an access category selected from a plurality of access categories. The first plurality of packets may comprise DL-MU-MIMO packets. Further, each of the packets in the plurality of packets may be associated with one of the access categories. For certain aspects, the access category may be selected from the plurality of access categories in an effort to resolve resource contention between the plurality of access categories. At 704, the access point may determine that an acknowledgment corresponding to the packet was not received from a designated apparatus of the plurality of apparatuses, wherein the designated apparatus is associated with the selected access category. At 706, the access point may increase a contention window (CW) for a backoff counter associated with the selected access category, based on the determination.

Figure 5A:
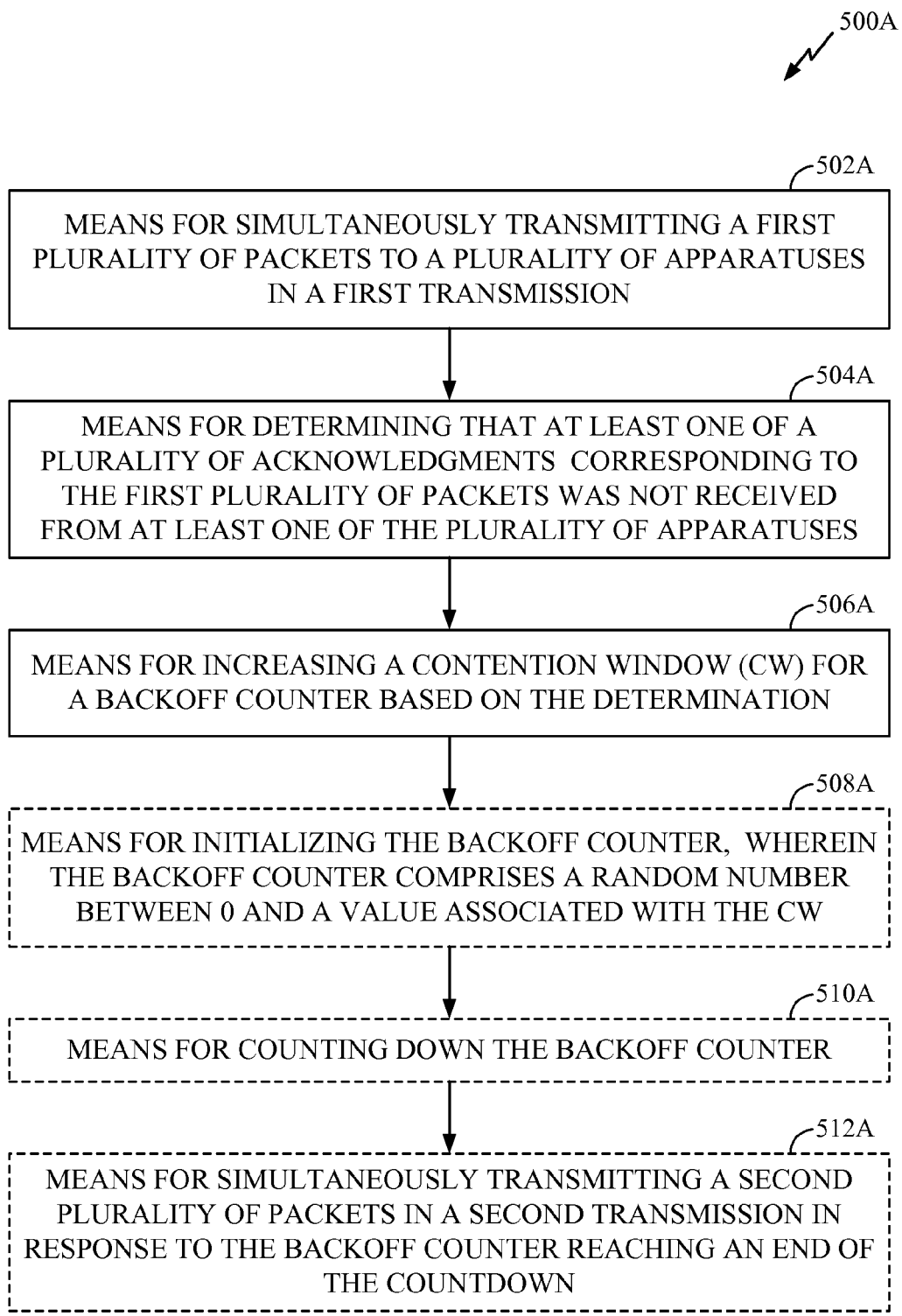
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for transmitting may comprise a transmitter, such as the transmitter unit 222 of the access point 110 illustrated in FIG. 2. Means for processing, means for determining, means for increasing, means for incrementing, means for raising, means for initializing, means for resetting, means for calculating, or means for counting may comprise a processing system, which may include one or more processors, such as the scheduler 234, the RX data processor 242, the TX data processor 210, and/or the controller 230 of the access point 110 illustrated in FIG. 2. Means for receiving may comprise a receiver, such as the receiver unit 222 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, performed by an apparatus, for wireless communications, comprising:
   simultaneously transmitting a first plurality of packets to a plurality of apparatuses in a first transmission;
   determining that at least one of a plurality of acknowledgments corresponding to the first plurality of packets was not received from at least one of the plurality of apparatuses; and
   increasing a contention window (CW) for a backoff counter based on the determination.

2. The method of claim 1, further comprising:
   initializing the backoff counter, wherein the backoff counter comprises a random number between 0 and a value of the CW;
   counting down the backoff counter; and
   in response to the backoff counter reaching an end of the countdown, simultaneously transmitting a second plurality of packets in a second transmission.

3. The method of claim 1, further comprising incrementing a counter based on the determination, wherein increasing the CW comprises calculating the CW based on the counter.

4. The method of claim 1, wherein determining that the at least one of the plurality of acknowledgments was not received comprises determining that a first acknowledgment of the plurality of acknowledgments expected to be received first in time was not received.

5. The method of claim 1, further comprising:
providing a plurality of counters, one counter for each of the plurality of apparatuses; and
for each of the plurality of counters:
incrementing the counter for a particular one of the apparatuses in response to not receiving one of the plurality of acknowledgments corresponding to the particular one of the apparatuses; and
resetting the counter for a particular one of the apparatuses in response to receiving one of the plurality of acknowledgments corresponding to the particular one of the apparatuses.

6. The method of claim 1, wherein the CW is a function of a class used in the first transmission.

7. The method of claim 1, wherein the plurality of acknowledgments comprises a plurality of valid block acknowledgments (BAs).

8. The method of claim 7, wherein each of the valid BAs comprises a block acknowledgment (BA) associated with a class used in the first transmission.

9. The method of claim 7, wherein each of the valid BAs comprises an affirmative acknowledgment of at least one media access control (MAC) protocol data unit (MPDU) in a corresponding one of the first plurality of packets.

10. The method of claim 1, wherein the first plurality of packets comprises a packet associated with an access category selected from a plurality of access categories, wherein the determining comprises determining that an acknowledgment corresponding to the packet was not received from a designated apparatus of the plurality of apparatuses, wherein the designated apparatus is associated with the selected access category, and wherein the increasing comprises increasing the CW for the backoff counter associated with the selected access category, based on the determination.

11. The method of claim 10, wherein each of the packets in the first plurality of packets is associated with one of the access categories.

12. The method of claim 10, wherein the packet comprises a head of line (HOL) packet of a packet queue associated with the selected access category.

13. The method of claim 10, further comprising:
initializing the backoff counter, wherein the backoff counter comprises a random number between 0 and a value of the CW;
counting down the backoff counter; and
in response to the backoff counter reaching an end of the countdown, simultaneously transmitting a second plurality of packets in a second transmission, wherein the second plurality of packets comprises the packet associated with the selected access category.

14. The method of claim 13, further comprising:
determining that another acknowledgment corresponding to the packet transmitted in the second plurality of packets was received from the designated apparatus; and
resetting the CW for the backoff counter associated with the selected access category, based on the determination.

15. The method of claim 10, wherein the packet associated with the selected access category is retransmitted until the acknowledgment corresponding to the packet is received from the designated apparatus, up to a maximum retransmission limit.

16. The method of claim 10, wherein the access category is selected according to Institute of Electrical and Electronics Engineers (IEEE) 802.11n enhanced distributed channel access (EDCA) rules.

17. An apparatus for wireless communications, comprising:
a transmitter configured to simultaneously transmit a first plurality of packets to a plurality of apparatuses in a first transmission; and
a processing system configured to:
determine that at least one of a plurality of acknowledgments corresponding to the first plurality of packets was not received from at least one of the plurality of apparatuses; and
increase a contention window (CW) for a backoff counter based on the determination.

18. The apparatus of claim 17, wherein the processing system is configured to initialize the backoff counter, wherein the backoff counter comprises a random number between 0 and a value of the CW and to count down the backoff counter, wherein in response to the backoff counter reaching an end of the countdown, the transmitter is configured to simultaneously transmit a second plurality of packets in a second transmission.

19. The apparatus of claim 17, wherein the processing system is configured to increment a counter based on the determination and to increase the CW by calculating the CW based on the counter.

20. The apparatus of claim 17, wherein the processing system is configured to determine that the at least one of the plurality of acknowledgments was not received by determining that a first acknowledgment of the plurality of acknowledgments expected to be received first in time was not received.

21. The apparatus of claim 17, wherein the processing system is configured to:
provide a plurality of counters, one counter for each of the plurality of apparatuses; and
for each of the plurality of counters:
to increment the counter for a particular one of the apparatuses in response to not receiving one of the plurality of acknowledgments corresponding to the particular one of the apparatuses; and
to reset the counter for a particular one of the apparatuses in response to receiving one of the plurality of acknowledgments corresponding to the particular one of the apparatuses.

22. The apparatus of claim 17, wherein the CW is a function of a class used in the first transmission.

23. The apparatus of claim 17, wherein the plurality of acknowledgments comprises a plurality of valid block acknowledgments (BAs).

24. The apparatus of claim 23, wherein each of the valid BAs comprises a block acknowledgment (BA) associated with a class used in the first transmission.

25. The apparatus of claim 23, wherein each of the valid BAs comprises an affirmative acknowledgment of at least one media access control (MAC) protocol data unit (MPDU) in a corresponding one of the first plurality of packets.

26. The apparatus of claim 17, wherein the first plurality of packets comprises a packet associated with an access category selected from a plurality of access categories, wherein the processing system is configured to determine that the at least one of the plurality of acknowledgments was not received by determining that an acknowledgment corresponding to the packet was not received from a designated apparatus of the plurality of apparatuses, wherein the designated apparatus is associated with the selected access category, and wherein the processing system is configured to increase the CW by increasing the CW for the backoff counter associated with the selected access category, based on the determination.

27. The apparatus of claim 26, wherein each of the packets in the first plurality of packets is associated with one of the access categories.

28. The apparatus of claim 26, wherein the packet comprises a head of line (HOL) packet of a packet queue associated with the selected access category.

29. The apparatus of claim 26, wherein the processing system is configured to:
  initialize the backoff counter, wherein the backoff counter comprises a random number between 0 and a value of the CW; and
  count down the backoff counter, wherein in response to the backoff counter reaching an end of the countdown, the transmitter is configured to simultaneously transmit a second plurality of packets in a second transmission, wherein the second plurality of packets comprises the packet associated with the selected access category.

30. The apparatus of claim 29, wherein the processing system is configured to:
  determine that another acknowledgment corresponding to the packet transmitted in the second plurality of packets was received from the designated apparatus; and
  reset the CW for the backoff counter associated with the selected access category, based on the determination.

31. The apparatus of claim 26, wherein the transmitter is configured to retransmit the packet associated with the selected access category until the acknowledgment corresponding to the packet is received from the designated apparatus, up to a maximum retransmission limit.

32. The apparatus of claim 26, wherein the access category is selected according to Institute of Electrical and Electronics Engineers (IEEE) 802.11n enhanced distributed channel access (EDCA) rules.

33. An apparatus for wireless communications, comprising:
  means for simultaneously transmitting a first plurality of packets to a plurality of apparatuses in a first transmission;
  means for determining that at least one of a plurality of acknowledgments corresponding to the first plurality of packets was not received from at least one of the plurality of apparatuses; and
  means for increasing a contention window (CW) for a backoff counter based on the determination.

34. The apparatus of claim 33, further comprising:
  means for initializing the backoff counter, wherein the backoff counter comprises a random number between 0 and a value of the CW;
  means for counting down the backoff counter; and
  means for simultaneously transmitting a second plurality of packets in a second transmission in response to the backoff counter reaching an end of the countdown.

35. The apparatus of claim 33, further comprising means for incrementing a counter based on the determination, wherein the means for increasing the CW comprises means for calculating the CW based on the counter.

36. The apparatus of claim 33, wherein the means for determining that the at least one of the plurality of acknowledgments was not received comprises means for determining that a first acknowledgment of the plurality of acknowledgments expected to be received first in time was not received.

37. The apparatus of claim 33, further comprising:
  means for providing a plurality of counters, one counter for each of the plurality of apparatuses; and
  for each of the plurality of counters:
    means for incrementing the counter for a particular one of the apparatuses in response to not receiving one of the plurality of acknowledgments corresponding to the particular one of the apparatuses; and
    means for resetting the counter for a particular one of the apparatuses in response to receiving one of the plurality of acknowledgments corresponding to the particular one of the apparatuses.

38. The apparatus of claim 33, wherein the CW is a function of a class used in the first transmission.

39. The apparatus of claim 33, wherein the plurality of acknowledgments comprises a plurality of valid block acknowledgments (BAs).

40. The apparatus of claim 39, wherein each of the valid BAs comprises a block acknowledgment (BA) associated with a class used in the first transmission.

41. The apparatus of claim 39, wherein each of the valid BAs comprises an affirmative acknowledgment of at least one media access control (MAC) protocol data unit (MPDU) in a corresponding one of the first plurality of packets.

42. The apparatus of claim 33, wherein the first plurality of packets comprises a packet associated with an access category selected from a plurality of access categories, wherein the means for determining is configured to determine that an acknowledgment corresponding to the packet was not received from a designated apparatus of the plurality of apparatuses, wherein the designated apparatus is associated with the selected access category, and wherein the means for increasing is configured to increase the CW for the backoff counter associated with the selected access category, based on the determination.

43. The apparatus of claim 42, wherein each of the packets in the first plurality of packets is associated with one of the access categories.

44. The apparatus of claim 42, wherein the packet comprises a head of line (HOL) packet of a packet queue associated with the selected access category.

45. The apparatus of claim 42, further comprising:
  means for initializing the backoff counter, wherein the backoff counter comprises a random number between 0 and a value of the CW;
  means for counting down the backoff counter; and
  in response to the backoff counter reaching an end of the countdown, means for simultaneously transmitting a second plurality of packets in a second transmission, wherein the second plurality of packets comprises the packet associated with the selected access category.

46. The apparatus of claim 45, further comprising:
  means for determining that another acknowledgment corresponding to the packet transmitted in the second plurality of packets was received from the designated apparatus; and
  means for resetting the CW for the backoff counter associated with the selected access category, based on the determination.

47. The apparatus of claim 42, wherein the means for transmitting is configured to retransmit the packet associated with the selected access category until the acknowledgment corresponding to the packet is received from the designated apparatus, up to a maximum retransmission limit.

48. The apparatus of claim 42, wherein the access category is selected according to Institute of Electrical and Electronics Engineers (IEEE) 802.11n enhanced distributed channel access (EDCA) rules.

49. A computer-program product for wireless communications, comprising a computer-readable storage device comprising instructions executable to:
- simultaneously transmit a first plurality of packets to a plurality of apparatuses in a first transmission;
- determine that at least one of a plurality of acknowledgments corresponding to the first plurality of packets was not received from at least one of the plurality of apparatuses; and
- increase a contention window (CW) for a backoff counter based on the determination.

50. An access point, comprising:
- at least one antenna;
- a transmitter configured to simultaneously transmit, via the at least one antenna, a first plurality of packets to a plurality of apparatuses in a first transmission; and
- a processing system configured to:
  - determine that at least one of a plurality of acknowledgments corresponding to the first plurality of packets was not received from at least one of the plurality of apparatuses; and
  - increase a contention window (CW) for a backoff counter based on the determination.

* * * * *